United States Patent [19]

Herbert

[11] 4,188,702
[45] Feb. 19, 1980

[54] METHOD AND APPARATUS FOR ORIENTING AND STRIPPING AN END PORTION OF A BUNDLE OF WIRES

[75] Inventor: Calvin J. Herbert, Glendale, Ariz.

[73] Assignee: Western Electric Company, Inc., New York, N.Y.

[21] Appl. No.: 973,667

[22] Filed: Dec. 27, 1978

[51] Int. Cl.² ............................................. H02G 1/12
[52] U.S. Cl. ...................................... 29/427; 81/9.51
[58] Field of Search ............. 29/427; 81/9.5 R, 9.5 A, 81/9.51

[56] References Cited

U.S. PATENT DOCUMENTS

| | | | |
|---|---|---|---|
| 3,706,241 | 12/1972 | Balmer et al. | 81/9.51 |
| 3,774,478 | 11/1973 | Carpenter et al. | 81/9.51 |
| 3,810,289 | 5/1974 | Hannaberg | 81/9.51 X |
| 3,817,127 | 6/1974 | Soeller | 81/9.51 |
| 3,881,246 | 5/1975 | Folk | 29/628 |
| 3,916,733 | 11/1975 | Meadows | 81/9.51 |
| 3,988,815 | 11/1976 | Petree | 29/33 K |
| 4,107,838 | 8/1978 | Keen et al. | 29/628 |

*Primary Examiner*—Milton S. Mehr
*Attorney, Agent, or Firm*—Robert B. Kennedy

[57] ABSTRACT

A method and apparatus is disclosed for orienting and stripping an end portion of a bundle of wires. The apparatus comprises a wire insulation stripper having a pair of blades with elongated, mutually parallel, planar cutting edges and means for moving the blades between an open position with the blade cutting edges spaced apart a distance to receiver therebetween a bundle of wires having metallic conductors of a common diameter sheathed with insulation, and a closed position with each blade cutting edge spaced apart another distance approximating the common conductor diameter. A clamp is mounted to one side of the stripper and a wire cutter mounted to the other side of the stripper. The apparatus further comprises means for reciprocally moving the stripper and cutter in tandem with respect to the clamp.

The method comprises the steps of extending a bundle of wires through an open clamp, through a pair of mutually parallel cutting blades of a wire insulation stripping device, and through a wire cutter. The wire insulation stripping device blades are converged into contact with the bundle causing the bundle of wires to fan out into a linear array and insulation of linearly arrayed wires to be cut. Convergence of the blades is terminated when the blades reach opposite sides of the metallic conductors sheathed within the insulation. The clamp is closed into gripping engagement with the wires and the wires severed with the wire cutter. The wire insulation stripping device and the cutter are then moved away from the clamp thereby stripping insulation from the conductors.

8 Claims, 8 Drawing Figures

METHOD AND APPARATUS FOR ORIENTING AND STRIPPING AN END PORTION OF A BUNDLE OF WIRES

TECHNICAL FIELD

This invention relates to apparatuses and methods for orienting and stripping an end portion of a bundle of wires.

BACKGROUND OF THE INVENTION

Telecommunication lines today commonly employ a large number of wires bundled together into a cylindrically configured cable with each wire having an electrical conductor sheathed with insulation. In connecting an end of the cable to ancillary electrical terminals, couplings and the like an end portion of each wire must be stripped of its insulation. Often these end portions must also be severed to provide uniform length to the exposed conductors. This can, of course, be accomplished manually but such it highly inefficient where the cable is composed of a large number of wires.

For this reason various devices have heretofore been developed to facilitate this task. One group of devices serves to reorient an end of the cable bundle mechanically into a linear array of wires to facilitate work to be performed on the cable wire ends. One of these devices is disclosed in U.S. Pat. No. 3,881,246 as having a template formed with a set of spaced grooves that merge with an enlarged groove or channel at one end. A bar is provided for movement between raised and lowered positions above the template as well as for movement over the surface of the template. With this device the free ends of cable wires may be placed upon the template in the enlarged groove and the bar lowered thereon causing the bundle of wires to fan out in that groove and over the surface of the template. The bar is then moved over the surface template forcing the wires into position within the various grooves that branch from the enlarged, common groove. After the free ends have been fanned into the grooves various work operations may then be performed on that portion of the ends which project beyond the template such as trimming, stripping, applying terminals or color identification. Another device in this general class is disclosed in U.S. Pat. No. 4,107,838 wherein an anvil is moved into pressure engagement with a bundle of wires and then moved axially in pressure contact over the wires a number of times in "ironing" the bundle into a planar array.

Another group of devices which facilitate the above described task serves the strip insulation from a group of wires which have been preoriented in a linear array. In U.S. Pat. No. 3,706,241, for example, apparatus is described for severing and stripping the ends of conductors of a ribbon cable whose member wires are manufactued in a planar array. Here the conductors are extended through and gripped by intermeshing teeth of a pair of multi-tooth jaws. Those portions of the conductors which extend beyond the jaws is severed and the insulation nicked by an insulation cutting blade at a point intermediate the jaws and the cutting blade. The wires are then pulled from between the pair of jaws thereby stripping their insulation while maintaining the stripped conductors in the planar array. U.S. Pat. No. 3,988,815 illustrates another example of this group of devices wherein again jaws having intermeshing teeth are employed into which various wires are guided after having been manually oriented. Means are provided for moving one set of jaws with respect to the other onto the wires and then moving the jaws together axially the wires in performing a stripping operation.

The just described two groups of devices are thus seen to reorient a bundle of wires into a linear array or to strip insulation from a group of wires which have already been oriented in a spaced array within multi-tooth jaws. It would, of course, be desirable to provide an apparatus and method for orienting stripping and serving an end portion of a bundle of wires with a single apparatus in one combined operation free of direct manual manipulation of the wires. The presence of the intermeshing teeth which the jaws of prior art apparatus have had has, however, impeded this development. It is with this problem that the present invention is primarily concerned.

SUMMARY OF THE INVENTION

In one form of the invention apparatus is provided for orienting and stripping an end portion of a bundle of wires. The apparatus comprises an insulation stripper having a pair of blades with elongated, mutually parallel planar cutting edges and means for moving the blades between an open position with the blade cutting edges spaced apart a distance to receive therebetween a bundle of wires having metallic conductors of a common diameter sheathed with insulation, and a closed position with the blade cutting edges spaced apart another distance approximating the common conductor diameter. A clamp is mounted to one side of the stripper and a wire cutter mounted to the other side of the stripper. The apparatus also includes means for reciprocally moving the stripper and cutter in tandem with respect to the clamp.

In another form of the invention a method is provided for orienting and stripping an end portion of a bundle of wires having metallic conductors of a common diameter sheathed with insulation. The method comprises the steps of extending the bundle through an open clamp, through a wire insulation stripping device having a pair of mutually parallel cutting blades, and through a wire cutter. The wire insulation stripping device blades are converged into contact with the bundle causing the wires to fan out into a linear array and insulation of the linearly arrayed wires to be cut. The convergence of the blades is terminated when the blades reach opposite sides of the metallic conductors. The clamp is closed into gripping engagement with the wires and the wires severed with the wire cutter. The wire insulation stripping device and the cutter are then moved away from the clamp thereby stripping insulation from the conductors.

DETAILED DESCRIPTION

Figure 1:
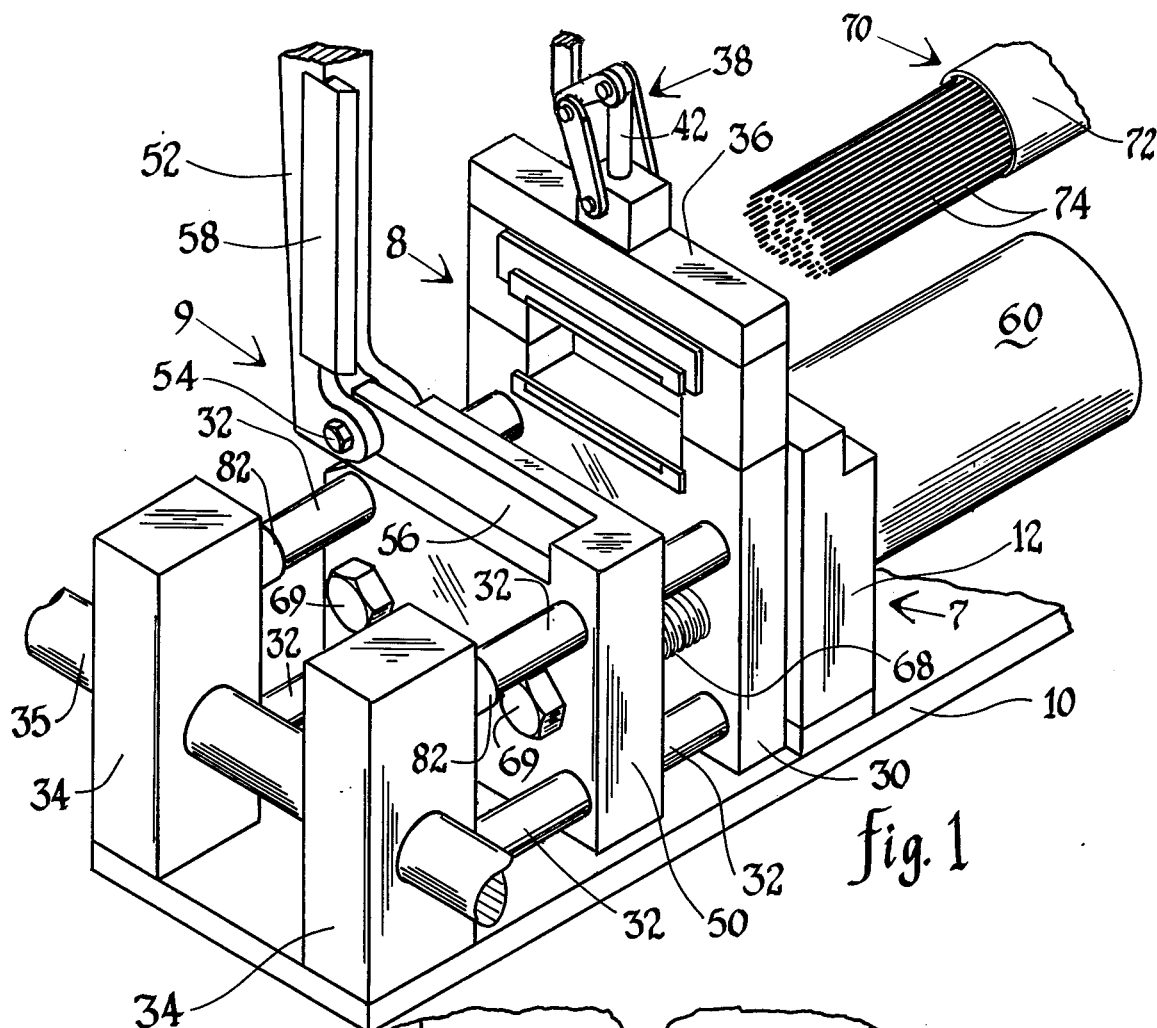
FIG. 1 is a perspective view of apparatus embodying principles of the present invention in one preferred form.
Figure 3:
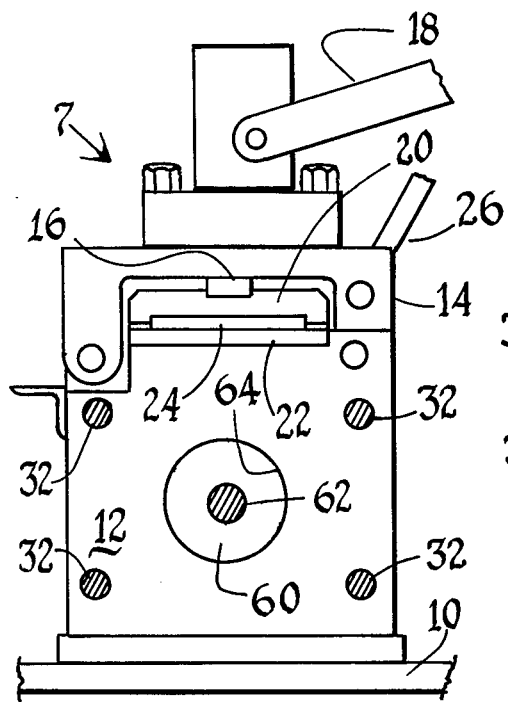
FIG. 3 is a front elevational view of the clamp component of the apparatus shown in FIG. 1.

Referring now in more detail to the drawing, there is shown in FIG. 1 an apparatus for orienting and stripping an end portion of a bundle of wires. The apparatus has clamp 7 rigidly mounted atop a base 10. The clamp is best shown in FIG. 3 as having a base lower member 12 and a base upper number 14. The upper member 14 supports a shaft 16 for vertical movement responsive to actuations of a handle 18. A clamp upper jaw 20 is mounted to the lower end of shaft 16 confronting a clamp lower jaw 24 is mounted. A latch 26 22 mounted atop the base lower member 12 to which a rubber pad is provided for holding the handle 18 down once the upper jaw 20 has been lowered in clamping cable wires to the lower jaw.

Figure 2:
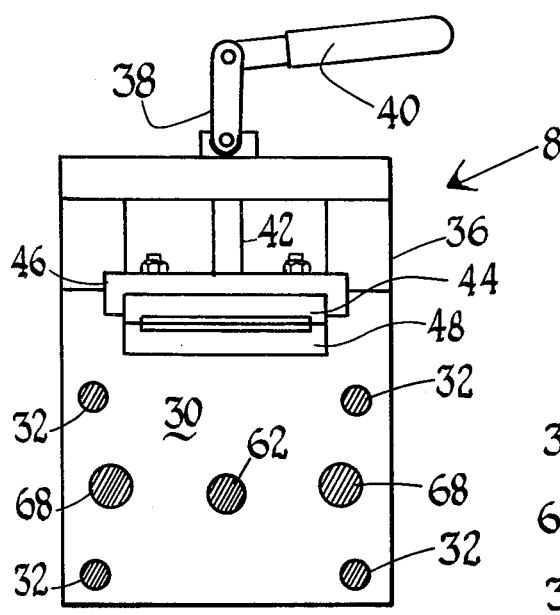
FIG. 2 is a front elevational view of the wire insulation stripping component of the apparatus shown in FIG. 1.

The apparatus also is seen also to include a wire insulation stripping device 8 which from FIG. 2 may be seen as having a lower base member 30 slidably mounted to guide rods 32. The guide rods are mounted at one end to the clamp base lower member 12 and at their otherend to a pair of upright pillows 34 mounted atop base 10. The pillows themselves are slidably mounted to a transversed guide rod 35 upon which the entire apparatus may slide in repositioning for use at various work stations.

The insulation stripping device 8 also has an upper base member 36 mounted atop the lower base member to which a toggle clamp 38 and clamp handle 40 are mounted for raising and lowering a shaft 42 linked thereto. An upper stripping blade 44 is mounted beneath an upperstripping blade mount 46 connected to the lower end of shaft 42 while a lower stripping blade 48 is mounted atop base 30 coplanar with the upper blade. From FIG. 7 the lower blade 48 may be seen to have an elongated, planar edge 45 which extends upwardly from the edge 45 two spaced coplanar step blade edges 49 offset ferm edge 45. The upper blade 44 however has but a single, elongated, planar edge 43 which overlays both the edges 45 and 49 of the lower blade. The offset distance between blade edges 45 and 49 of the lower blade approximates the diameter of the metallic conductors of the wires to be stripped of insulation.

Figure 4:
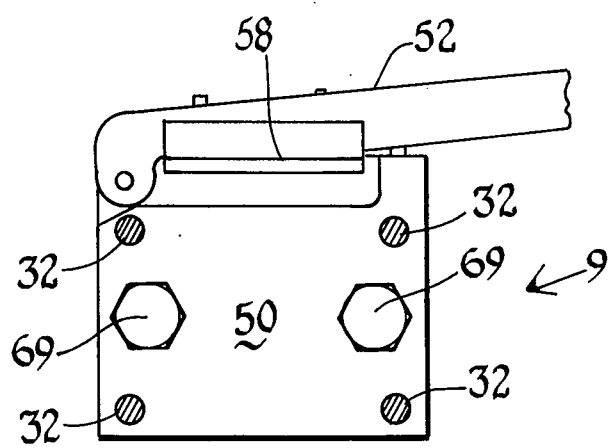
FIG. 4 is a front elevational view of the wire cutter component of the apparatus depicted in FIG. 1.

The apparatus further comprises a wire cutter 9 which from FIG. 4 may be seen as having a base 50 slidably mounted upon the four guide rods 32. The cutter has a handle 52 pivotally mounted by a pivot pin 54 atop base 50. A blade 58 is mounted beneath the handle for sheathing movement over a side surface of shear block 56 in effecting a wire cutting operation.

If FIG. 1 the apparatus is further seen to include means for moving wire cutter 9 and the insulation stripper 8 jointly and in tandem along the guide rods 32 towards and away from the clamp 7. This means includes a cylinder 60 mounted to the base 10 by unshown cylinder mounting feet. The cylinder has a cylinder rod 62 which, as shown in FIG. 3, extends through a hole 64 in the clamp base lower member and to the insulation stripping device base 30 to which the cylinder rod is threaded and secured. The insulation stripping device is rigidly coupled with the wire cutter 9 by a pair of bolts 68 having bolt heads 69 which may be rotated to adjust the distance between the cutter and stripper to alter the length of bare conductor to be exposed upon being stripped. With this assembly operation of the cylinder may reciprocally move the insulation stripping device 8 along the the guide rods 32 which movement in turn causes the wire cutter 9 to move in tandem with the stripping device.

Figure 7:
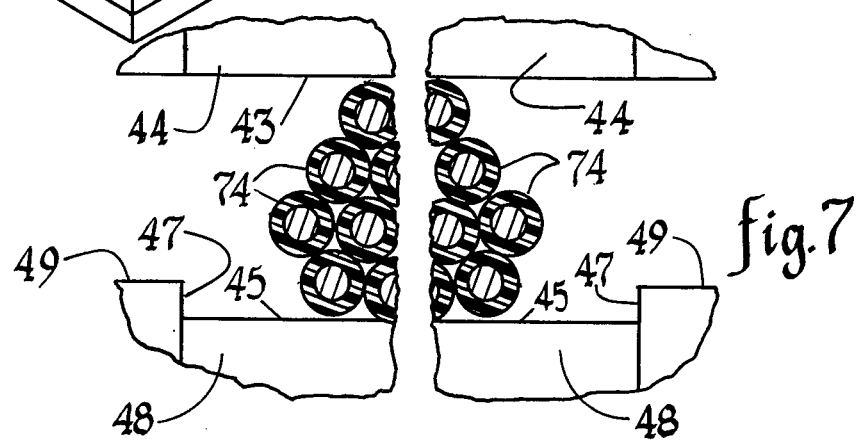
FIGS. 7 and 8 are enlarged front elevational views of a fragment of the wire insulation stripping component shown in FIG. 2 also illustrating the sequence of operations.
Figure 8:
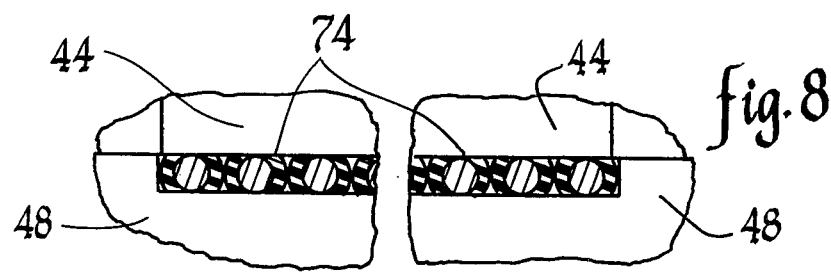

In operation the sleeve or jacket 72 of an end portion of a cable 70 is stripped away to expose a cylindrical bundle of insulated wires 74 as shown in FIG. 1. The bundle of wires is inserted through the clamp 7, through the insulation stripping device 8 and through the cutter 9 until the ends of the wire 74, which will often be of somewhat different lengths, are located adjacent the pillows 34. The insulation stripping device 8 is then operated by rotating handle 40 clockwise causing the upper blade 44 to descend toward the lower blade 48. As this occurs the upper blade makes contact with the bundle of wires 74 which are at rest upon the lower blade as shown in FIGS. 7. Further lowering of the upper blade converent upon the lower blade forces the bundle of wires to fan out into a linear array. Convergence of the two blades is continued until the planar lower edge 43 of the upper blade engages the segmented, lower blade edges 49 as shwon in FIG. 8. As the height of the blade steps to each side of the lower blade edge 45 approximates the diameter of the wire conductors, the blades upon coming together will have cut into the wire insulation and reached the metallic conductors again as shown in FIG. 8. At this point it is seen that the array of wires extends fully from one shoulder 47 to the other. This, however, is not necessary since the number of wires in the bundle may be such as to extend in an abutting array only partially the distance between the two shoulders.

Figures 5, 6:
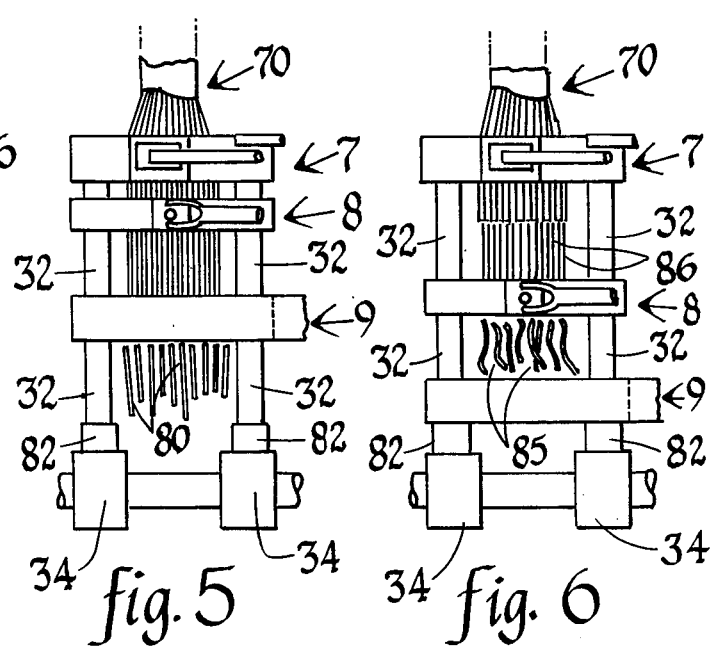
FIGS. 5 and 6 are plan views of the apparatus shown in FIG. 1 illustrating a sequence of operations using the apparatus in performing a method of the invention.

Next the clamp 7 is closed by rotating the clamp handle 18 clockwise and holding it in a down position with latch 26. This serves to hold the array of wires firmly in a fixed position with respect to the apparatus base 10. The wire cutter 9 is now also actuated by rotating cutter handle 52 causing the upper cutter blade 58 to descend over the shear block 56 thereby severing end portions 80 of the wires as shown in FIG. 5. Finally, the cylinder 60 is actuated causing the insulation stripping device 8 and the cutter 9 to move together away from the clamp 7 and their position occupied in FIG. 5 along the guide rods 32 over base 10 until the cutter reaches resilent stops 82 that are mounted about the guide rods flush against the pillows 34 in the position shown in FIG. 6. This action causes terminal sections of insulation 85 to be stripped from terminal ends of the now exposed metallic conductors 86. Handle 40 of the insulation stripping device and handled 18 of the clamp may then be raised to release the cable from the apparatus.

It thus is seen that an apparatus and method is provided for orienting and stripping an end portion of a bundle of wires in an efficient and effective manner. It should be understood however that the just described embodiments merely illustrate principles of the invention in preferred forms. Many modifications, additions and deletions may, of course, be made thereto without departure from the spirit and scope of the invention as set forth in the following claims.

I claim:

1. Apparatus for orienting and stripping an end portion of a bundle of wires comprising, in combination, an insulation stripper having a pair of blades with elongated mutually parallel planar cutting edges and means for moving said blades between an open position with said blade cutting edges spaced apart a distance to receive therebetween a bundle of wires having metallic conductors of a common diameter sheathed with insulation and a closed position with said blade cutting edges spaced apart another distance approximately said common conductor diameter; a clamp mounted to one side of said stripper; a wire cutter mounted to the other side of said stripper; and means for reciprocally moving said stripper and said cutter in tandem with respect to said clamp.

2. Apparatus for orienting and stripping an end portion of a bundle of wires in accordance with claim 1 wherein said clamp has a pair of jaws with generally planar mutually confronting gripping surfaces, and means for reciprocally moving said jaw gripping surfaces towards and away from one another in clamping and unclamping an array of wires extending between said jaws.

3. Apparatus for orienting and stripping an end portion of a bundle of wires in accordance with claim 1 wherein said stripper is rigidly coupled with said cutter, and wherein said stripper and said cutter are slidable mounted upon a plurality of guide rods projecting from said clamp.

4. Apparatus for orienting and stripping an end portion of a bundle of wires in accordance with claim 3 wherein said reciprocally moving means comprises an air cylinder having a cylinder rod extending through said clamp and rigidly coupled with said stripper and said cutter.

5. Apparatus for orienting and stripping an end portion of a bundle of wires in accordance with claim 1 wherein one of said stripper blades elongated cutting edge lies in a first plane with opposite ends bounded by two mutually spaced blade steps having step edges lying in a common second plane parallel with and offset from said first plane by a distance approximating said common conductor diameter, and wherein another of said stripper blades elongated planar cutting edge extends over said one blade cutting edge and over said one blade mutually spaced step edges.

6. A method of orienting and stripping an end portion of a bundle of wires having metallic conductors of common diameter sheathed with insulation, and with the method comprising the steps of:
 (a) extending the bundle through an open clamp and through a wire insulation stripping device having a pair of mutually parallel cutting blades and through a wire cutter;
 (b) converging the wire insulation stripping device blades into contact with the bundle causing the bundle wires to fan out into a linear array and insulation of the lineraly arrayed wires to be cut;
 (c) terminating the convergence of the blades when the blades substantially reach opposite sides of the metallic conductors sheathed within the insulation;
 (d) closing the clamp into gripping engagement with the wires;
 (e) severing the wires with the wire cutter; and
 (f) moving the wire insulation stripping device and the wire cutter away from the clamp thereby stripping insulation from the conductors.

7. The method of orienting and stripping an end portion of a bundle of wires in accordance with claim 6 wherein steps (a) through (f) are performed sequentially.

8. The method of orienting and stripping an end portion of a bundle of wires in accordance with claim 6 wherein step (f) the wire insulation stripping device and the wire cutter are moved in tandem away from the clamp.

* * * * *